United States Patent
Choi et al.

(10) Patent No.: US 10,141,567 B2
(45) Date of Patent: Nov. 27, 2018

(54) CATHODE ACTIVE MATERIAL FOR LITHIUM SECONDARY BATTERY, METHOD OF PREPARING THE SAME, AND LITHIUM SECONDARY BATTERY CONTAINING THE SAME

(71) Applicant: L&F CO., LTD., Daegu (KR)

(72) Inventors: Su An Choi, Daegu (KR); Ho Jun Jeong, Daegu (KR); Sang Hoon Jeon, Daegu (KR); Ji Woon Yang, Daegu (KR); Jun Ho Shin, Daegu (KR); Ji Sun An, Daegu (KR); Bong Jun Jeong, Daegu (KR)

(73) Assignee: L&F CO., LTD., Daegu (KR)

( * ) Notice: Subject to any disclaimer, the term of this patent is extended or adjusted under 35 U.S.C. 154(b) by 197 days.

(21) Appl. No.: 15/171,144

(22) Filed: Jun. 2, 2016

(65) Prior Publication Data

US 2016/0276659 A1 Sep. 22, 2016

Related U.S. Application Data

(63) Continuation-in-part of application No. PCT/KR2014/002354, filed on Mar. 20, 2014.

(30) Foreign Application Priority Data

Dec. 2, 2013 (KR) .......................... 10-2013-0148779

(51) Int. Cl.
  *H01M 4/36* (2006.01)
  *H01M 4/136* (2010.01)
  (Continued)

(52) U.S. Cl.
  CPC ......... *H01M 4/366* (2013.01); *H01M 4/0402* (2013.01); *H01M 4/0471* (2013.01);
  (Continued)

(58) Field of Classification Search
  CPC ...... H01M 4/36; H01M 4/1315; H01M 4/136; H01M 4/13915; H01M 4/1397; H01M 4/48; H01M 10/0525
  See application file for complete search history.

(56) References Cited

U.S. PATENT DOCUMENTS

2008/0206650 A1* 8/2008 Kim ..................... H01M 4/131 429/326
2009/0253042 A1 10/2009 Sun et al.
(Continued)

FOREIGN PATENT DOCUMENTS

KR 20080099131 A 11/2008
KR 20100052419 A 5/2010
(Continued)

OTHER PUBLICATIONS

Notice of Allowance, KIPO, dated Jun. 16, 2016, Korean Patent Application No. 10-2014-0170863.
(Continued)

*Primary Examiner* — Kenneth J Douyette
(74) *Attorney, Agent, or Firm* — Lex IP Meister, PLLC (57) ABSTRACT

There are provided a cathode active material for a lithium secondary battery, a method of preparing the same, and a lithium secondary battery containing the same. The cathode active material for a lithium secondary battery includes: a core made of a compound reversibly intercalating and deintercalating lithium; and a coating layer positioned on at least a portion of a surface of the compound, wherein the coating layer is a composite coating layer containing $Li_3PO_4$ and LiF, and further containing a lithium metal compound, a metal oxide, a metal fluoride compound, and/or a combination thereof, and the core is doped with fluorine.

18 Claims, 3 Drawing Sheets

(51) Int. Cl.
*H01M 4/1315* (2010.01)
*H01M 10/0525* (2010.01)
*H01M 4/48* (2010.01)
*H01M 4/525* (2010.01)
*H01M 4/62* (2006.01)
*H01M 4/04* (2006.01)
*H01M 4/13915* (2010.01)
*H01M 4/1397* (2010.01)
*H01M 4/485* (2010.01)
*H01M 4/50* (2010.01)
*H01M 4/505* (2010.01)
*H01M 4/52* (2010.01)
*H01M 4/58* (2010.01)
*H01M 10/052* (2010.01)
*H01M 4/02* (2006.01)

(52) U.S. Cl.
CPC ......... *H01M 4/136* (2013.01); *H01M 4/1315* (2013.01); *H01M 4/1397* (2013.01); *H01M 4/13915* (2013.01); *H01M 4/483* (2013.01); *H01M 4/485* (2013.01); *H01M 4/502* (2013.01); *H01M 4/505* (2013.01); *H01M 4/523* (2013.01); *H01M 4/525* (2013.01); *H01M 4/582* (2013.01); *H01M 4/5825* (2013.01); *H01M 4/62* (2013.01); *H01M 10/0525* (2013.01); *H01M 10/052* (2013.01); *H01M 2004/028* (2013.01)

(56) References Cited

U.S. PATENT DOCUMENTS

| 2011/0076556 A1 | 3/2011 | Karthikeyan et al. |
| 2011/0217598 A1* | 9/2011 | Kawashima ........ H01M 10/02 429/303 |
| 2011/0236751 A1 | 9/2011 | Amiruddin et al. |
| 2012/0034516 A1 | 2/2012 | Koo et al. |
| 2013/0040193 A1 | 2/2013 | Tsuchida et al. |
| 2013/0142943 A1* | 6/2013 | Kubo ................ H01M 4/1397 427/58 |

FOREIGN PATENT DOCUMENTS

| KR | 10-2011-0019574 | 2/2011 |
| KR | 20110063335 A | 6/2011 |
| KR | 20120028622 A | 3/2012 |
| KR | 10-1169947 | 8/2012 |
| KR | 20120099375 A | 9/2012 |
| KR | 20120139833 A | 12/2012 |
| KR | 10-2013-0014241 | 2/2013 |
| KR | 20130060180 A | 6/2013 |
| WO | 2012105009 | 8/2012 |

OTHER PUBLICATIONS

Search Report and Written Opinion in International Application No. PCT/KR2014/002354 dated Sep. 1, 2014, 13 pages (English translation of search report only).

* cited by examiner

CATHODE ACTIVE MATERIAL FOR LITHIUM SECONDARY BATTERY, METHOD OF PREPARING THE SAME, AND LITHIUM SECONDARY BATTERY CONTAINING THE SAME

CROSS REFERENCE TO RELATED APPLICATIONS

This is a continuation-in-part of International Application No. PCT/KR2014/002354 filed on Mar. 20, 2014, which claims the priority of Korean Patent Application No. 10-2013-0148779 filed on Dec. 2, 2013, the entire respective disclosures of which are incorporated herein by reference.

TECHNICAL FIELD

The present invention relates to a method of preparing a cathode active material for a lithium secondary battery and a cathode active material for a lithium secondary battery.

BACKGROUND ART

In accordance with the recent trend toward miniaturization and lightness of portable electronic devices, the necessity for high performance and large capacity of a battery used as a power source of these devices has increased.

A battery may generate power using materials capable of being electrochemically reacted in a cathode and an anode. As a representative example of the battery as described above, there is a lithium secondary battery generating electrical energy by a change in chemical potential when lithium ions are intercalated into/deintercalated from the cathode and the anode.

The lithium secondary battery is manufactured by using materials capable of reversibly intercalating and deintercalating lithium ions as a cathode active material and an anode active material, and filling an organic electrolyte or a polymer electrolyte between the cathode and the anode.

As the cathode active material of the lithium secondary battery, a lithium complex metal compound has been used. As examples of the lithium complex metal compounds, complex metal oxides such as $LiCoO_2$, $LiMn_2O_4$, $LiNiO_2$, $LiMnO_2$, and the like, have been studied.

Among the cathode active materials, Mn based cathode active materials such as $LiMn_2O_4$, $LiMnO_2$, and the like, are attractive materials having advantages in that they are easily synthesized, are relatively cheap, have the most excellent thermal stability at the time of over-charge as compared to other active materials, and cause little environmental contamination, but have a disadvantage in that capacity is small.

Since $LiCoO_2$ has excellent electric conductivity, a high battery voltage of about 3.7V or so, and excellent cycle life characteristics, stability, and discharge capacity, $LiCoO_2$ is a representative cathode active material commercialized and being sold in the market. However, since $LiCoO_2$ is expensive and occupies 30% of a cost of the battery, there is a problem in that price competitiveness is deteriorated.

Further, among the above-mentioned cathode active materials, $LiNiO_2$ has the highest discharge capacity in view of battery characteristics but has a disadvantage in that it is difficult to synthesize $LiNiO_2$. Further, a high oxidation state of nickel may deteriorate cycle life of a battery and electrodes, cause excessive self-discharge, and deteriorate reversibility. In addition, it is not easy to completely secure stability, such that it is difficult to commercialize $LiNiO_2$.

As the related art, a method of coating a phosphorus compound to impart ion conductivity or roles of a protective layer against metal elusion and side reactions in order to improve performance of a cathode active material has been disclosed below.

A cathode active material for a lithium secondary battery, having a surface on which $Li_3PO_4$ is coated for safety and high capacity of a battery has been disclosed in KR1169947. However, in a method of physically dry-coating $Li_3PO_4$, which is a coating material, it is impossible to improve a structure in an utmost surface of the cathode active material, and a chemical reaction with remaining Li does not occur.

Further, a cathode active material of which high-rate capability and cycle characteristics are improved by containing an oxide coating layer formed on a core of the cathode active material has been disclosed in KR2009-0077163. However, in a method of pre-preparing a metal phosphate and coating the pre-prepared metal phosphate on an active material, since binding strength of the pre-prepared metal phosphate is high, at the time of coating, a reaction with a cathode material is not sufficiently carried out, such that there is a limitation in improving a surface structure, and only an effect of coating a single oxide phosphate has been disclosed in KR2009-0077163.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a cathode active material for a lithium secondary battery having high capacity and excellent cycle life characteristics, and a lithium secondary battery including a cathode containing the cathode active material.

Technical Solution

An exemplary embodiment of the present invention provides a cathode active material for a lithium secondary battery including a core made of a compound reversibly intercalating and deintercalating lithium; and a coating layer positioned on at least a portion of a surface of the compound, wherein the coating layer is a composite coating layer containing $Li_3PO_4$ and LiF, and further containing a lithium metal compound, a metal oxide, a metal fluoride compound, and/or a combination thereof, and the core is doped with fluorine.

Lithium of $Li_3PO_4$, LiF, and/or the lithium metal compound contained in the composite coating layer may be derived from Li contained in the compound reversibly intercalating and deintercalating lithium or from a separate Li source material.

Metals in the lithium metal compound, the metal oxide, and the metal fluoride compound contained in the composite coating layer may be each independently Na, K, Mg, Ca, Sr, Ni, Co, Ti, Al, Si, Sn, Mn, Cr, Fe, V, Zr, or a combination thereof.

The lithium metal compound contained in the composite coating layer may be $Li_2TiO_3$, $LiAlO_2$, $Li_2ZrO_3$, $Li_2SiO_3$, $Li_4SiO_4$, or a combination thereof.

The metal oxide contained in the composite coating layer may be $TiO_2$, $Al_2O_3$, $SiO_2$, $ZrO_2$, or a combination thereof.

The metal fluoride compound contained in the composite coating layer may be $AlF_3$, $TiF_4$, $CoF_2$, $NiF_2$, $MnF_2$, $ZrF_4$, $SiF_4$, or a combination thereof.

Fluorine of the metal fluoride compound in the composite coating layer may be derived from fluorine contained in the core doped with fluorine.

A molar doping ratio of fluorine in the core may be 0.001 to 0.01.

Some of oxygen atoms in the core may be doped with fluorine.

Metal elements in the core may be Na, K, Mg, Ca, Sr, Ni, Co, Ti, Al, Si, Sn, Mn, Cr, Fe, V, Zr, or a combination thereof.

A content of the coating layer may be 0.2 to 2.0 wt % based on a total weight of the cathode active material.

A content of P in the composite coating layer may be 500 to 5000 ppm.

The compound reversibly intercalating and deintercalating lithium may be at least one selected from the group consisting of $Li_aA_{1-b}X_bD_2$ ($0.90 \leq a \leq 1.8$, $0 \leq b \leq 0.5$); $Li_aA_{1-b}X_bO_{2-c}T_c$ ($0.90 \leq a \leq 1.8$, $0 \leq b \leq 0.5$, $0 \leq c \leq 0.05$); $LiE_{1-b}X_bO_{2-c}D_c$ ($0 \leq b \leq 0.5$, $0 \leq c \leq 0.05$); $LiE_{2-b}X_bO_{4-c}T_c$ ($0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_{2-e}T_e$ ($0.90 \leq a \leq 1.8$, $0 \leq b \leq 0.9$, $0 \leq c \leq 0.5$, $0.001 \leq d \leq 0.1$, $0 \leq e \leq 0.05$); $Li_aNi_bCo_cMn_dG_eO_{2-f}T_f$ ($0.90 \leq a \leq 1.8$, $0 \leq b \leq 0.9$, $0 \leq c \leq 0.5$, $0 \leq d \leq 0.5$, $0.001 \leq e \leq 0.1$, $0 \leq e \leq 0.05$); $Li_aNiG_bO_{2-c}T_c$ ($0.90 \leq a \leq 1.8$, $0.001 \leq b \leq 0.1$, $0 \leq c \leq 0.05$); $Li_aCoG_bO_{2-c}$ ($0.90 \leq a \leq 1.8$, $0.001 \leq b \leq 0.1$, $0 \leq c \leq 0.05$); $Li_aMnG'_bO_{2-c}T_c$ ($0.90 \leq a \leq 1.8$, $0.001 \leq b \leq 0.1$, $0 \leq c \leq 0.05$); $Li_aMn_2G_bO_{2-c}T_c$ ($0.90 \leq a \leq 1.8$, $0.001 \leq b \leq 0.1$, $0 \leq c \leq 0.05$); $Li_aMnG'_bPO_4$ ($0.90 \leq a \leq 1.8$, $0.001 \leq b \leq 0.1$); $LiNiVO_4$; and $Li_{(3-f)}J_2(PO_4)_3$ ($0 \leq f \leq 2$).

In Chemical Formulas, A is selected from the group consisting of Ni, Co, Mn, and a combination thereof; X is selected from the group consisting of Al, Ni, Co, Mn, Cr, Fe, Mg, Sr, V, rare earth elements, and a combination thereof; D is selected from the group consisting of O, F, S, P, and a combination thereof; E is selected from the group consisting of Co, Mn, and a combination thereof; T is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof.

Another embodiment of the present invention provides a method of preparing a cathode active material for a lithium secondary battery including: preparing a core material containing a compound reversibly intercalating and deintercalating lithium, and doped with fluorine; preparing a lithium source, a phosphorus source, and/or a metal source; uniformly attaching the lithium source, the phosphorous source, and/or the metal source onto a surface of the core material by mixing the lithium source, the phosphorous source, and/or the metal source with the core material; and obtaining the core material of which a composite coating layer containing $Li_3PO_4$ and LiF and further containing a lithium metal compound, a metal oxide, a metal fluoride compound, and/or a combination thereof is formed on the surface by heat-treating the core material onto which the lithium source, the phosphorous source, and/or the metal source are attached.

The preparing of the core material containing the compound capable of reversibly intercalating and deintercalating lithium, and doped with fluorine may be performed by a method of mixing the compound reversibly intercalating and deintercalating lithium with a fluorine compound and heat-treating the mixture, and a heat-treatment temperature may be 800 to 1050° C.

The fluorine compound used in a method of mixing the compound reversibly intercalating and deintercalating lithium with a fluorine compound and heat-treating the mixture may be LiF, $AlF_3$, $MgF_2$, $CaF_2$, $ZrF_4$, $TiF_4$, or a combination thereof.

In the obtaining of the core material of which the composite coating layer containing $Li_3PO_4$ and LiF and further containing the lithium metal compound, the metal oxide, the metal fluoride compound, and/or the combination thereof is formed on the surface by heat-treating the core material onto which the lithium source, the phosphorous source, and/or the metal source are attached, a heat-treatment temperature may be 650 to 950° C.

Yet another embodiment of the present invention provides a lithium secondary battery including a cathode containing the cathode active material for a lithium secondary battery as described above; an anode containing an anode active material; and an electrolyte.

Advantageous Effects

According to an embodiment of the present invention, the cathode active material having excellent battery characteristics and the lithium secondary battery containing the same may be provided.

MODE FOR INVENTION

Hereinafter, exemplary embodiments of the present invention will be described in detail. However, the embodiments are described for illustrative purpose, but the present invention is not limited thereto. Therefore, the present invention will be defined by the scope of the appended claims to be described below.

An exemplary embodiment of the present invention provides a cathode active material for a lithium secondary battery including a core made of a compound capable of reversibly intercalating and deintercalating lithium; and a coating layer positioned on at least a portion of a surface of the compound, wherein the coating layer is a composite coating layer containing $Li_3PO_4$ and LiF, and further containing a lithium metal compound, a metal oxide, a metal fluoride compound, and/or a combination thereof, and the core is doped with fluorine.

Several compounds in the composite coating layer may be compounds formed by heat-treatment reactions.

In addition, lithium of $Li_3PO_4$, LiF, and/or the lithium metal compound contained in the composite coating layer may be derived from Li contained in the compound capable of reversibly intercalating and deintercalating lithium or from a separate Li source material.

The cathode active material including the composite coating layer containing $Li_3PO_4$ and LiF and further containing the lithium metal compound, the metal oxide, the metal fluoride compound, and/or the combination thereof may improve battery characteristics of a lithium secondary battery. In more detail, it is possible to provide a cathode active material having improved efficiency at a high voltage as compared to an existing cathode active material.

The compounds containing Li in the composite coating layer may serve to increase diffusivity of Li ions in the cathode active material and facilitate movement of the lithium ions, thereby contributing to improvement of battery characteristics.

Further, LiF and the metal fluoride compound may deteriorate wettability with respect to an electrolyte, thereby serving to suppress side reactions.

The composite coating layer may cause a synergistic effect on surface modification through complex binding between the compounds on the surface of the cathode active material.

The composite coating layer contains the lithium metal compound and the metal oxide, such that it is possible to improve ion conductivity, stabilize a surface structure, and suppress side reactions with the electrolyte.

In more detail, metals in the lithium metal compound, the metal oxide, and the metal fluoride compound contained in the composite coating layer may be each independently Na, K, Mg, Ca, Sr, Ni, Co, Ti, Al, Si, Sn, Mn, Cr, Fe, V, Zr, or a combination thereof.

As a specific example, in order to significantly increase efficiency of the synergistic effect of the coating layer, $Li_3PO_4$, LiF, and a coating layer composed of a compound including the lithium metal compound such as $Li_2TiO_3$, $LiAlO_2$, $Li_2ZrO_3$, $Li_2SiO_3$, $Li_4SiO_4$, or a combination thereof, a coating layer containing the metal oxide such as $TiO_2$, $Al_2O_3$, $ZrO_2$, $SiO_2$, or a combination thereof, or a coating layer containing the metal fluoride compound such as $AlF_3$, $TiF_4$, $CoF_2$, $NiF_2$, $MnF_2$, $ZrF_4$, $SiF_4$, or a combination thereof may separately exist.

Further, the coating layer may exist in a form of a composite coating layer composed of a combination of the several compounds. In more detail, the composite coating layer may improve battery characteristics at a high voltage.

A content of the composite coating layer may be 0.2 to 2.0 wt % based on a total weight of the cathode active material. In the case in which the content is less than 0.2 wt %, roles of the coating layer may be deteriorated, and in the case in which the content is more than 2.0 wt %, initial capacity and charge and discharge efficiency may be deteriorated. However, the content is not limited thereto.

A content of P in the composite coating layer may be 500 to 5000 ppm.

The core containing the compound capable of reversibly intercalating and deintercalating lithium may be doped with fluorine, and a fluorine source of the core may be a fluorine compound.

The core contains fluorine to suppress the side reactions with the electrolyte, thereby making it possible to minimize structure disintegration by the electrolyte. Surface modification of the composite coating layer and structure stabilization of the core containing fluorine may have synergistic effects on improving battery characteristics.

A molar doping ratio of fluorine in the core may be 0.001 to 0.01. In the case in which the molar doping ratio is less than 0.001, the effect may not be exhibited, and in the case in which the molar doping ratio is more than 0.01, battery characteristics may be deteriorated.

Some of oxygen atoms in the core may be doped with fluorine. Further, metal elements in the core may be Na, K, Mg, Ca, Sr, Ni, Co, Ti, Al, Si, Sn, Mn, Cr, Fe, V, Zr, or a combination thereof. However, the metal element is not limited thereto.

Fluorine of the metal fluoride compound contained in the composite coating layer may be derived from fluorine contained in the core doped with fluorine.

As a specific example, the compound capable of reversibly intercalating and deintercalating lithium may be at least one selected from the group consisting of $Li_aA_{1-b}X_bD_2$ (0.90≤a≤1.8, 0≤b≤0.5); $Li_aA_{1-b}X_bO_{2-c}T_c$ (0.90≤a≤1.8, 0≤b≤0.5, 0≤c≤0.05); $LiE_{1-b}X_bO_{2-c}D_c$ (0≤b≤0.5, 0≤c≤0.05); $LiE_{2-b}X_bO_{4-c}T_c$ (0≤b≤0.5, 0≤c≤0.05); $Li_aNi_{1-b-c}Co_bX_cD_\alpha$ (0.90≤a≤1.8, 0≤b≤0.5, 0≤c≤0.05, 0<α≤2); $Li_aNi_{1-b-c}Co_bX_cO_{2-\alpha}T_\alpha$ (0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0<α≤2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_{2-e}T_e$ (0.90≤a≤1.8, 0≤b≤0.9, 0≤c≤0.5, 0.001≤d≤0.1, 0≤e≤0.05); $Li_aNi_bCo_cMn_dG_eO_{2-f}T_f$ (0.90≤a≤1.8, 0≤b≤0.9, 0≤c≤0.5, 0≤d≤0.5, 0.001≤e≤0.1, 0≤e≤0.05); $Li_aNiG_bO_{2-c}T_c$ (0.90≤a≤1.8, 0.001≤b≤0.1, 0≤c≤0.05); $Li_aCoG_bO_{2-c}T_c$ (0.90≤a≤1.8, 0.001≤b≤0.1, 0≤c≤0.05); $Li_aMnG'_bO_{2-c}T_c$ (0.90≤a≤1.8, 0.001≤b≤0.1, 0≤c≤0.05); $Li_aMn_2G_bO_{2-c}T_c$ (0.90≤a≤1.8, 0.001≤b≤0.1, 0≤c≤0.05); $Li_aMnG'_bPO_4$ (0.90≤a≤1.8, 0.001≤b≤0.1); $LiNiVO_4$; and $Li_{(3-f)}O_2(PO_4)_3$ (0≤f≤2).

In Chemical Formulas, A is selected from the group consisting of Ni, Co, Mn, and a combination thereof; X is selected from the group consisting of Al, Ni, Co, Mn, Cr, Fe, Mg, Sr, V, rare earth elements, and a combination thereof; D is selected from the group consisting of O, F, S, P, and a combination thereof; E is selected from the group consisting of Co, Mn, and a combination thereof; T is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof.

Another embodiment of the present invention provides a method of preparing a cathode active material for a lithium secondary battery including: preparing a core material containing a compound capable of reversibly intercalating and deintercalating lithium, and doped with fluorine; preparing a lithium source, a phosphorus source, and/or a metal source; uniformly attaching the lithium source, the phosphorous source, and/or the metal source onto a surface of the core material by mixing the lithium source, the phosphorous source, and/or the metal source with the core material; and obtaining a core material of which a composite coating layer containing $Li_3PO_4$ and LiF and additionally containing a lithium metal compound, a metal oxide, a metal fluoride compound, and/or a combination thereof is formed on the surface by heat-treating the core material onto which the lithium source, the phosphorous source, and/or the metal source are attached.

The preparing of the core material containing the compound capable of reversibly intercalating and deintercalating lithium, and doped with fluorine may be performed by mixing the compound capable of reversibly intercalating and deintercalating lithium with a fluorine compound and heat-treating the mixture, and a heat-treatment temperature may be 800 to 1050° C.

In the case of firing at a temperature lower than 800° C., room-temperature and high-temperature battery characteristics may be rapidly deteriorated, and in the case of firing at a temperature higher than 1050° C., capacity and a capacity retention rate may be rapidly deteriorated. However, the present invention is not limited thereto.

The fluorine compound used in a method of mixing the compound capable of reversibly intercalating and deintercalating lithium with the fluorine compound and heat-treating the mixture may be LiF, $AlF_3$, $MgF_2$, $CaF_2$, $ZrF_4$, $TiF_4$, or a combination thereof.

In the obtaining of the core material of which the composite coating layer containing $Li_3PO_4$ and LiF and additionally containing the lithium metal compound, the metal oxide, the metal fluoride compound, and/or the combination thereof is formed on the surface by heat-treating the core material onto which the lithium source, the phosphorous source, and/or the metal source are attached, a heat-treatment temperature may be 650 to 950° C. In the case in which the heat-treatment temperature is within the above-mentioned range, the coating layer formed on the surface of the cathode active material may stably perform roles.

The lithium source may be lithium carbonate, lithium nitrate, lithium sulfate, lithium acetate, lithium phosphate, lithium chloride, lithium hydroxide, lithium oxide, or a combination thereof. However, the lithium source is not limited thereto.

The metal source may be a metal oxide, a metal alkoxide, a metal hydroxide, a metal halide, or a combination thereof. However, the metal source is not limited thereto.

The phosphorus source may be $(NH_4)_2HPO_4$, $NH_4H_2PO_4$, $Li_3PO_4$, $P_2O_5$, or a combination thereof. However, the phosphorus source is not limited thereto.

Since other configurations are the same as those in the exemplary embodiment of the present invention described above, a description thereof will be omitted.

Another embodiment of the present invention provides a lithium secondary battery including a cathode, an anode, and an electrolyte, wherein the cathode includes a current collector and a cathode active material layer formed on the current collector, the cathode active material layer containing the cathode active material as described above.

Since the cathode active material is the same as that in the exemplary embodiment of the present invention described above, a description thereof will be omitted.

The cathode active material layer may contain a binder and a conductive material.

The binder serves to appropriately bind cathode active material particles to each other and appropriately bind the cathode active material to the current collector. As a representative example of the binder, polyvinylalcohol, carboxymethylcellulose, hydroxypropylcellulose, diacetylcellulose, polyvinylchloride, carboxylated polyvinylchloride, polyvinylfluoride, a polymer including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, nylon, or the like, may be used, but the binder is not limited thereto.

The conductive material is used in order to impart conductivity to an electrode, and any material may be used as long as it does not cause chemical changes in a battery to be configured, and is an electron-conductive material. As an example, a conductive material including a carbon based material such as natural graphite, artificial graphite, carbon black, acetylene black, Ketjen black, carbon fiber, or the like; a metal based material such as metal powder or metal fiber of copper, nickel, aluminum, silver, or the like; a conductive polymer such as a polyphenylene derivative, or the like; or a mixture thereof may be used.

The anode includes a current collector, and an anode active material layer formed on the current collector, wherein the anode active material layer contains an anode active material.

An example of the anode active material includes a material capable of reversibly intercalating and deintercalating lithium ions, a lithium metal, a lithium metal alloy, a material capable of doping and dedoping lithium, or a transition metal oxide.

As the material capable of reversibly intercalating and deintercalating lithium ions, any carbon based anode active material may be used as long as it is generally used as a carbon material in a lithium ion secondary battery. As a representative example, crystalline carbon or amorphous carbon may be used, or crystalline carbon and amorphous carbon may be used together with each other. Examples of the crystalline carbon may include non-shaped or sheet, flake, spherical, or fiber-shaped natural graphite or artificial graphite, and examples of the amorphous carbon may include soft carbon (low-temperature fired carbon), hard carbon, mesophase pitch carbide, fired cokes, and the like.

As the lithium metal alloy, an alloy of lithium and a metal selected from the group consisting of Na, K, Rb, Cs, Fr, Be, Mg, Ca, Sr, Si, Sb, Pb, In, Zn, Ba, Ra, Ge, Al, and Sn may be used.

Examples of the material capable of doping and dedoping lithium may include Si, $SiO_x$ ($0<x<2$), a Si—Y alloy (Y is an element selected from the group consisting of alkali metals, alkali earth metals, group 13 elements, group 14 elements, transition metals, rare earth elements, and a combination thereof, but is not Si), Sn, $SnO_2$, Sn—Y (Y is an element selected from the group consisting of alkali metals, alkali earth metals, group 13 elements, group 14 elements, transition metals, rare earth elements, and a combination thereof, but is not Sn), and the like. In addition, at least one thereof may also be mixed with $SiO_2$ and then used. Y may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

Examples of the transition metal oxide may include vanadium oxide, lithium vanadium oxide, and the like.

The anode active material layer may also contain a binder, and selectively, the anode active material layer may further contain a conductive material.

The binder serves to appropriately bind anode active material particles to each other and appropriately bind the anode active material to the current collector. As a representative example of the binder, polyvinylalcohol, carboxymethylcellulose, hydroxypropylcellulose, polyvinylchloride, carboxylated polyvinylchloride, polyvinylfluoride, a polymer including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, nylon, or the like, may be used, but the binder is not limited thereto.

The conductive material is used in order to impart conductivity to the electrode, and any material may be used as long as it does not cause chemical changes in a battery to be configured and is an electron-conductive material. As an example, a conductive material including a carbon based material such as natural graphite, artificial graphite, carbon black, acetylene black, Ketjen black, carbon fiber, or the like; a metal based material such as metal powder or metal fiber of copper, nickel, aluminum, silver, or the like; a conductive polymer such as a polyphenylene derivative, or the like; or a mixture thereof may be used.

As the current collector, a material selected from the group consisting of copper foil, nickel foil, stainless steel foil, titanium foil, nickel foam, copper foam, a polymer substrate coated with a conductive metal, and a combination thereof may be used.

As a material of the current collector, Al may be used, but the current collector is not limited thereto.

The anode and the cathode may be manufactured by mixing active materials, the conductive material, and the binder in a solvent to prepare active material compositions, and applying the compositions on the current collector, respectively. Since a method of manufacturing an electrode as described above is well-known in the art, a detailed description thereof will be omitted in the present specification. As the solvent, N-methylpyrrolidone, or the like, may be used, but the solvent is not limited thereto.

The electrolyte may contain a non-aqueous organic solvent and a lithium salt.

The non-aqueous organic solvent may serve as a medium through which ions participating in electrochemical reactions of a battery may move.

As the non-aqueous organic solvent, a carbonate based solvent, an ester based solvent, an ether based solvent, a ketone based solvent, an alcohol based solvent, or an aprotic solvent may be used. As the carbonate based solvent, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like, may be used, and as the ester based solvent, methyl acetate, ethyl acetate, n-propyl acetate, dimethylacetate, methylpropionate, ethylpropionate, γ-butyrolactone, decanolide, valerolactone, mevalonolactone, caprolactone, or the like, may be used. As the ether based solvent, dibutyl ether, tetraglyme, diglyme, dimethoxyethane, 2-methyltetrahydrofuran, tetrahydrofuran, or the like, may be used, and as the ketone based solvent, cyclohexanone, or the like, may be used. In addition, as the alcohol based solvent, ethyl alcohol, isopropyl alcohol, or the like, may be used, and as the aprotic solvent, nitriles such as R—CN (R is a linear, branched, or cyclic hydrocarbon group having 2 to 20 carbon atoms and may include a double bond aromatic ring or an ether bond), amides such as dimethyl formamide, or the like, dioxolanes such as 1,3-dioxolane, or the like, sulfolanes, or the like, may be used.

The non-aqueous organic solvents may be used alone or a mixture of at least one thereof may be used. In the case in which the mixture of at least one thereof is used, a mixing ratio may be appropriately adjusted depending on the desired performance of the battery, which may be obvious to those skilled in the art.

Further, in the case of the carbonate based solvent, it is preferable to use a mixture of a cyclic carbonate and a chain carbonate. In this case, when the cyclic carbonate and the chain carbonate are mixed with each other in a volume ratio of 1:1 to 1:9, performance of the electrolyte may be excellent.

The non-aqueous organic solvent according to the exemplary embodiment of the present invention may further include an aromatic hydrocarbon based organic solvent in addition to the carbonate based solvent. In this case, the carbonate based solvent and the aromatic hydrocarbon based organic solvent may be mixed with each other in a volume ratio of 1:1 to 30:1.

As the aromatic hydrocarbon based organic solvent, an aromatic hydrocarbon based compound represented by the following Chemical Formula 1 may be used.

[Chemical Formula 1]

(In Chemical Formula 1, $R_1$ to $R_6$ are each independently hydrogen, halogen, a (C1-C10) alkyl group, a haloalkyl group, or a combination thereof.)

The aromatic hydrocarbon based organic solvent may be selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and a combination thereof.

The non-aqueous electrolyte may further contain vinylene carbonate or an ethylene carbonate based compound represented by Chemical Formula 2 in order to improve a cycle life of a battery.

[Chemical Formula 2]

(In Chemical Formula 2, $R_7$ and $R_8$ are each independently hydrogen, a halogen group, a cyano (CN) group, a nitro ($NO_2$) group, or a (C1-C5) fluoroalkyl group, at least one of $R_7$ and $R_8$ being the halogen group, the cyano (CN) group, the nitro ($NO_2$) group, or the (C1-C5) fluoroalkyl group.)

A representative example of the ethylene carbonate based compound may include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, or the like. In the case of adding an additive for improving a cycle life as described above, a usage amount thereof may be appropriately adjusted.

The lithium salt is a material dissolved in an organic solvent to serve as a lithium ion source in a battery to thereby enable a basic operation of a lithium secondary battery and promote movement of lithium ions between a cathode and an anode. Representative examples of the lithium salt as described above may include one or two or more selected from the group consisting of $LiPF_6$, $LiBF_4$, $LiSbF_6$, $LiAsF_6$, $LiC_4F_9SO_3$, $LiClO_4$, $LiAlO_2$, $LiAlCl_4$, LiN ($C_xF_{2x+1}SO_2$, $C_yF_{2y+1}SO_2$) (where, x and y are natural numbers), LiCl, LiI and $LiB(C_2O_4)_2$ (lithium bis(oxalato) borate; LiBOB) as a supporting electrolytic salt. It is preferable that the lithium salt is used in a concentration range of 0.1 to 2.0M. In the case in which the concentration of the lithium salt is within the above-mentioned range, since the electrolyte has suitable conductivity and viscosity, performance of the electrolyte may be excellent, and lithium ions may effectively move.

A separator may be present between the cathode and the anode depending on the kind of lithium secondary battery. As the separator as described above, a separator made of polyethylene, polypropylene, or polyvinylidene fluoride, or a multilayer separator having at least two layers made of these materials may be used. Also, a mixed multilayer separator such as a polyethylene/polypropylene double-layered separator, a polyethylene/polypropylene/polyethylene triple-layered separator, polypropylene/polyethylene/polypropylene triple-layered separator, and the like, may be used.

Lithium secondary batteries may be classified as a lithium ion battery, a lithium ion polymer battery, and a lithium polymer battery depending on the kinds of separator and electrolyte used therein, be classified as a cylindrical battery, a prismatic battery, a coin type battery, a pouch type battery, and the like, depending on a shape thereof, and be classified as a bulk type battery and a thin film type battery depending on a size thereof. Since structures and manufacturing methods of these batteries are well-known in the art, a detailed description thereof will be omitted.

Figure 1:
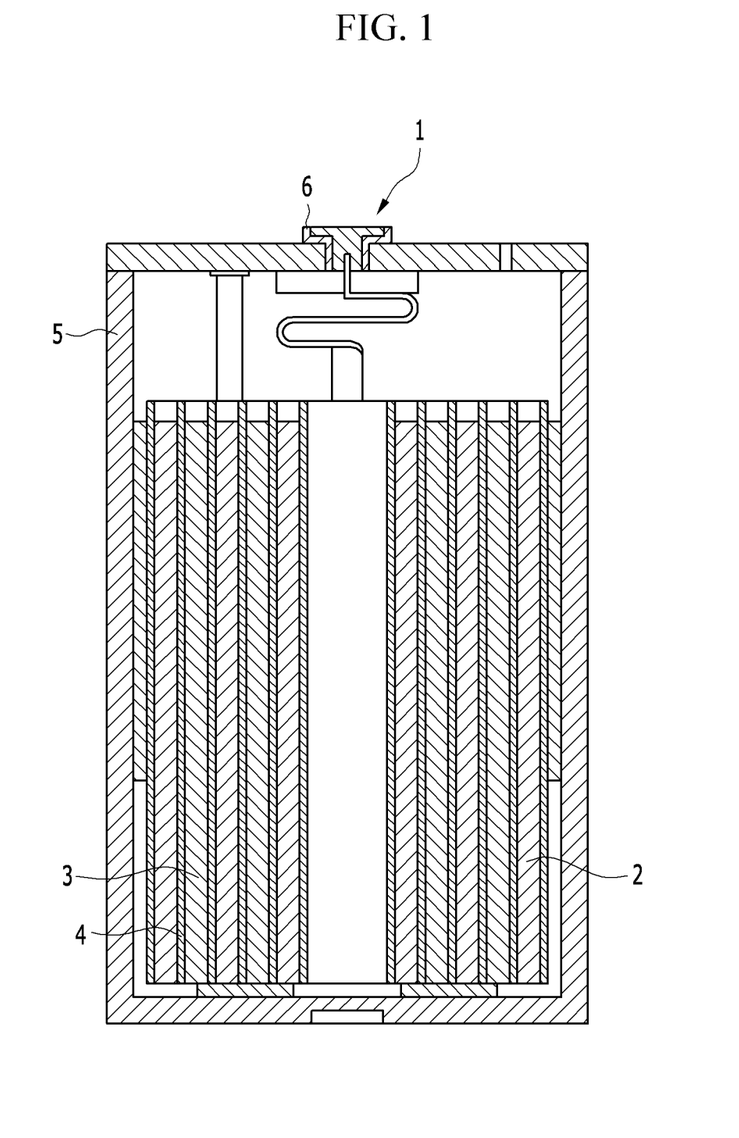
FIG. 1 is a schematic view of a lithium secondary battery.

FIG. 1 schematically illustrates a representative structure of a lithium secondary battery according to the present invention. As illustrated in FIG. 1, the lithium secondary battery 1 includes a cathode 3, an anode 2, a battery container 5 including an electrolyte impregnated into a separator 4 interposed between the cathode 3 and the anode 2, and an encapsulation member 6 encapsulating the battery container 5.

Hereinafter, Examples and Comparative Examples of the present invention will be described. However, the following Examples are provided only as examples of the present invention. Therefore, the present invention is not limited thereto.

EXAMPLE

Example 1

A mixture obtained by mixing $Co_3O_4$ as a transition metal precursor, $MgF_2$ (0.01 wt %) as a metal fluoride compound, and $Li_2CO_3$ at a stoichiometric ratio was heat-treated at 1000° C. for 10 hours, thereby preparing a cathode active material.

A prepared core was $LiCo_{1-x}Mg_xO_{2-y}F_y$ (0<x<0.1, 0<y<0.01).

After 100 g of the prepared $LiCo_{1-x}Mg_xO_{2-y}F_y$ (0<x<0.1, 0<y<0.01), 0.064 g of LiOH powder, 0.027 g of $Al(OH)_3$ powder, 0.245 g of $TiO_2$ powder, and 1.331 g of $(NH_4)_2HPO_4$ powder were dry-mixed in a mixer to prepare a mixture in which these powders were attached onto a surface of a $LiCo_{1-x}Mg_xO_{2-y}F_y$ (0<x<0.1, 0<y<0.01) body, the mixture was heat-treated at 800° C. for 6 hours, thereby preparing a cathode active material.

Example 2

After 100 g of $LiCo_{1-x}Mg_xO_{2-y}F_y$ (0<x<0.1, 0<y<0.01) prepared in Example 1, 0.054 g of LiOH powder, 0.287 g of $Zr(OH)_4$ powder, 0.027 g of $SiO_2$ powder, and 1.331 g of $(NH_4)_2HPO_4$ powder were dry-mixed in a mixer to prepare a mixture in which these powders were attached onto a surface of a $LiCo_{1-x}Mg_xO_{2-y}F_y$ (0<x<0.1, 0<y<0.01) body, the mixture was heat-treated at 800° C. for 6 hours, thereby preparing a cathode active material.

Example 3

A mixture obtained by mixing $Ni_{0.60}Co_{0.20}Mn_{0.20}(OH)_2$ as a transition metal precursor, $MgF_2$ (0.01 wt %) as a metal fluoride compound, and $Li_2CO_3$ at a stoichiometric ratio was heat-treated at 890° C. for 10 hours, thereby preparing a cathode active material.

A prepared core was $Li(Ni_{0.60}Co_{0.20}Mn_{0.20})_{1-x}Mg_xO_{2-y}F_y$ (0<x<0.1, 0<y<0.01).

After 100 g of the prepared $Li(Ni_{0.60}Co_{0.20}Mn_{0.20})_{1-x}Mg_xO_{2-y}F_y$ (0<x<0.1, 0<y<0.01), 0.064 g of LiOH powder, 0.027 g of $Al(OH)_3$ powder, 0.245 g of $TiO_2$ powder, and 1.331 g of $(NH_4)_2HPO_4$ powder were dry-mixed to prepare a mixture in which these powders were attached onto a surface of a $Li(Ni_{0.60}Co_{0.20}Mn_{0.20})_{1-x}Mg_xO_{2-y}F_y$ (0<x<0.1, 0<y<0.01) body, the mixture was heat-treated at 800° C. for 6 hours, thereby preparing a cathode active material.

Comparative Example 1

A cathode active material was prepared by the same method as in Example 1 except for dry-mixing 100 g of $LiCoO_2$ that was not doped with fluorine in a mixer to prepare a mixture.

Comparative Example 2

A cathode active material was prepared by the same method as in Example 2 except for dry-mixing 100 g of $LiCoO_2$ that was not doped with fluorine in a mixer to prepare a mixture.

Comparative Example 3

A cathode active material was prepared by the same method as in Example 3 except for dry-mixing 100 g of $LiNi_{0.60}Co_{0.20}Mn_{0.20}O_2$ that was not doped with fluorine in a mixer to prepare a mixture.

Manufacturing of Coin Cell 95 wt % of each of the cathode active materials prepared in Examples and Comparative Examples, 2.5 wt % of carbon black as a conductive material, and 2.5 wt % of polyvinylidene fluoride (PVDF) as a binder were added to 5.0 wt % of N-methyl-2 pyrrolidone (NMP) as a solvent, thereby preparing cathode slurry. The cathode prepared slurry was applied onto an aluminum (Al) thin film (thickness: 20 to 40 µm) corresponding to a cathode current collector, vacuum-dried, and roll-pressed, thereby manufacturing a cathode.

As an anode, a Li metal was used.

A coin-cell type half cell was manufactured using the cathode manufactured as described above, the Li metal as a counter electrode, and 1.15M LiPF$_6$ in ethylene carbonate (EC):dimethyl carbonate (DMC) (1:1 vol %) as an electrolyte.

Charge and discharge were performed in a range of 4.5 to 3.0 V, and cycle life was measured at a C-rate of 1.0 C.

Experimental Example 1: Evaluation of Battery Characteristics

The following Table 1 shows initial formation data (4.5V), rate capability data, capacity data at $1^{st}$ cycle, $20^{th}$ cycle, and $30^{th}$ cycle, and cycle life characteristic data in Examples and Comparative Examples. The following Table 2 shows information on coating layers in Examples and Comparative Examples.

Experimental Example 2: Measurement of XPS

Figure 2:
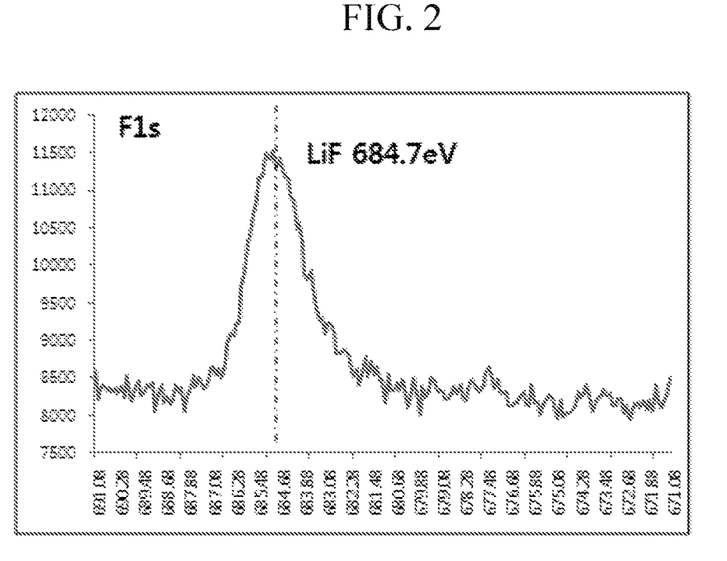
FIG. 2 illustrates an X-ray photoelectron spectroscopy (XPS) result of a cathode active material prepared in Example 1.

X-ray photoelectron spectroscopy (XPS) was performed on the cathode active material prepared in Example 1, and the result was illustrated in FIG. 2. It was confirmed from FIG. 2 that the coating layer contained LiF.

Experimental Example 3: Measurement of XRD

Figure 3:
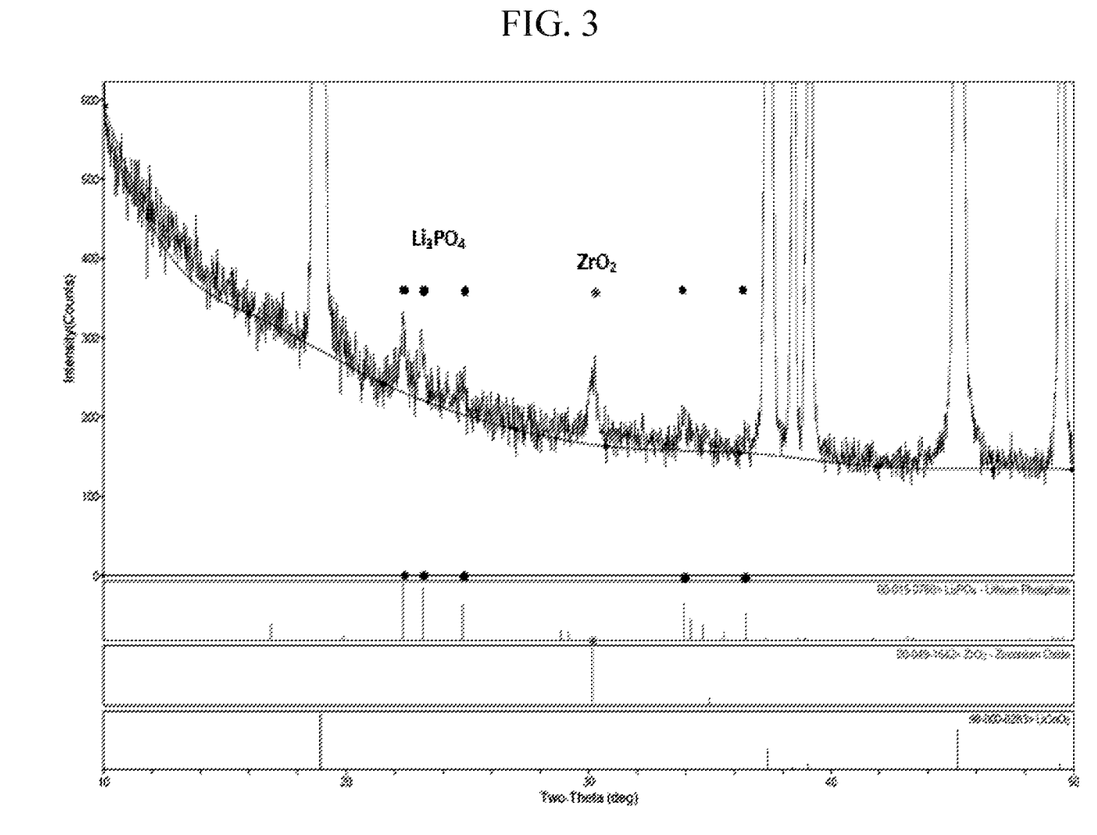
FIG. 3 illustrates an X-ray diffraction (XRD) result of a cathode active material prepared in Example 2.

X-ray diffraction (XRD) analysis was performed on the cathode active material prepared in Example 2, and the result was illustrated in FIG. 3. X-ray diffraction was performed using an X-ray diffraction system (UltimaIV, Rigaku) (conditions: room temperature (25° C.), CuKα, voltage: 40 kV, current: 3 mA, 10 to 90 deg, step size: 0.01 deg, step scan mode). It may be confirmed from FIG. 3 that the cathode active material of Example 2 contained Li$_3$PO$_4$.

TABLE 1

|  | Discharge Capacity (mAh/g) | Efficiency | Discharge Capacity (1st CY) | Discharge Capacity (20th CY) | Discharge Capacity (30th CY) | Cycle Life Characteristics (20th CY/1st C, %) | Cycle Life Characteristics (30 CY/1 CY, %) | Rate Capability (1.0/0.1 C, %) |
|---|---|---|---|---|---|---|---|---|
| Example 1 | 192.13 | 97.85 | 186.64 | 183.76 | 182.59 | 98.46 | 97.83 | 96.86 |
| Example 2 | 191.61 | 97.74 | 186.31 | 183.12 | 182.01 | 98.29 | 97.69 | 96.47 |
| Example 3 | 196.91 | 89.22 | 191.25 | 178.66 | 169.11 | 93.42 | 88.42 | 91.21 |
| Comparative Example 1 | 191.79 | 97.24 | 185.73 | 181.48 | 177.88 | 97.71 | 95.77 | 96.75 |
| Comparative Example 2 | 192.75 | 97.77 | 187.10 | 180.03 | 176.21 | 96.22 | 94.18 | 96.39 |
| Comparative Example 3 | 196.97 | 89.17 | 190.58 | 173.07 | 160.75 | 90.81 | 84.35 | 90.47 |

TABLE 2

|  | Coating Elements | Compounds in Coating Layer |
|---|---|---|
| Example 1 | Li, Al, Ti, P | Li$_3$PO$_4$, LiF, AlF$_3$, LiAlO$_2$, Li$_2$TiO$_3$, Al$_2$O$_3$, TiO$_2$ |
| Example 2 | Li, Zr, Si, P | Li$_3$PO$_4$, LiF, ZrF$_4$, Li$_2$ZrO$_3$, Li$_2$SiO$_3$, ZrO$_2$, SiO$_2$ |
| Example 3 | Li, Al, Ti, P | Li$_3$PO$_4$, LiF, AlF$_3$, LiAlO$_2$, Li$_2$TiO$_3$, Al$_2$O$_3$, TiO$_2$ |
| Comparative Example 1 | Li, Al, Ti, P | Li$_3$PO$_4$, LiAlO$_2$, Li$_2$TiO$_3$, Al$_2$O$_3$, TiO$_2$ |
| Comparative Example 2 | Li, Zr, Si, P | Li$_3$PO$_4$, Li$_2$ZrO$_3$, Li$_2$SiO$_3$, ZrO$_2$, SiO$_2$ |
| Comparative Example 3 | Li, Al, Ti, P | Li$_3$PO$_4$, LiAlO$_2$, Li$_2$TiO$_3$, Al$_2$O$_3$, TiO$_2$ |

As illustrated in Table 1, it was confirmed that in Examples 1 and 2 in which a composite coating layer containing Li$_3$PO$_4$ and LiF and further containing the lithium metal compound, the metal oxide, and/or the metal fluoride compound, and a core doped with fluorine were included, battery characteristics were more excellent as compared to Comparative Examples 1 and 2.

In more detail, it was confirmed that in the cases of the cathode active materials of Examples, efficiency and cycle life characteristics were more excellent as compared to Comparative Examples 1 and 2. It was confirmed that there were differences in cycle life characteristics as compared to Comparative Examples in which the composite coating layer was included, but the core was not doped with fluorine.

In addition, it was confirmed that differences in characteristics between the Examples and the Comparative Examples were equally implemented between Example 3 and Comparative Example 3 having different compositions.

The present invention is not limited to the exemplary embodiments disclosed herein but will be implemented in various forms. Those skilled in the art to which the present invention pertains will appreciate that various modifications and alterations may be made without departing from the spirit or essential feature of the present invention. Therefore, it should be understood that the above-mentioned embodiments are not restrictive but are exemplary in all aspects.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A cathode active material for a lithium secondary battery, the cathode active material comprising:

a core made of a compound reversibly intercalating and deintercalating lithium; and a coating layer positioned on at least a portion of a surface of the compound, wherein the coating layer is a composite coating layer containing Li$_3$PO$_4$ and LiF, and the core is doped with fluorine.

2. The cathode active material of claim 1, wherein:

lithium of Li$_3$PO$_4$, LiF, and/or the lithium metal compound contained in the composite coating layer is derived from Li contained in the compound reversibly intercalating and deintercalating lithium or from a separate Li source material.

3. The cathode active material of claim 1, wherein:
metals in the lithium metal compound, the metal oxide, and the metal fluoride compound contained in the composite coating layer,
are each independently Na, K, Mg, Ca, Sr, Ni, Co, Ti, Al, Si, Sn, Mn, Cr, Fe, V, Zr, or a combination thereof.

4. The cathode active material of claim 1, wherein:
the lithium metal compound contained in the composite coating layer is $Li_2TiO_3$, $LiAlO_2$, $Li_2ZrO_3$, $Li_2SiO_3$, $Li_4SiO_4$, or a combination thereof.

5. The cathode active material of claim 1, wherein:
the metal oxide contained in the composite coating layer is $TiO_2$, $Al_2O_3$, $SiO_2$, $ZrO_2$, or a combination thereof.

6. The cathode active material of claim 1, wherein:
the metal fluoride compound contained in the composite coating layer is $AlF_3$, $TiF_4$, $CoF_2$, $NiF_2$, $MnF_2$, $ZrF_4$, $SiF_4$, or a combination thereof.

7. The cathode active material of claim 1, wherein:
fluorine of the metal fluoride compound in the composite coating layer,
is derived from fluorine contained in the core doped with fluorine.

8. The cathode active material of claim 1, wherein:
a molar doping ratio of fluorine in the core is 0.001 to 0.01.

9. The cathode active material of claim 1, wherein:
some of oxygen atoms in the core are doped with fluorine.

10. The cathode active material of claim 1, wherein:
a content of the coating layer is 0.2 to 2.0 wt % based on a total weight of the cathode active material.

11. The cathode active material of claim 1, wherein:
a content of P in the composite coating layer is 500 to 5000 ppm.

12. The cathode active material of claim 1, wherein:
the compound reversibly intercalating and deintercalating lithium is at least one selected from the group consisting of $Li_aA_{1-b}X_bD_2$ ($0.90 \leq a \leq 1.8$, $0 \leq b \leq 0.5$); $Li_aA_{1-b}X_bO_{2-c}T_c$ ($0.90 \leq a \leq 1.8$, $0 \leq b \leq 0.5$, $0 \leq c \leq 0.05$); $LiE_{1-b}X_bO_{2-c}D_c$ ($0 \leq b \leq 0.5$, $0 \leq c \leq 0.05$); $LiE_{2-b}X_bO_{4-c}T_c$ ($0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 < \alpha < 2$); $Li_aNi_bE_cG_dO_{2-e}T_e$ ($0.90 \leq a \leq 1.8$, $0 \leq b \leq 0.9$, $0 \leq c \leq 0.5$, $0.001 \leq d \leq 0.1$, $0 \leq e \leq 0.05$); $Li_aNi_bCo_cMn_d G_eO_{2-f}T_f$ ($0.90 \leq a \leq 1.8$, $0 \leq b \leq 0.9$, $0 \leq c \leq 0.5$, $0 \leq d \leq 0.5$, $0.001 \leq e \leq 0.1$, $0 \leq e \leq 0.05$); $Li_aNiG_bO_{2-c}T_c$ ($0.90 \leq a \leq 1.8$, $0.001 \leq b \leq 0.1$, $0 \leq c \leq 0.05$); $Li_aCoG_bO_{2-c}$ ($0.90 \leq a \leq 1.8$, $0.001 \leq b \leq 0.1$, $0 \leq c \leq 0.05$); $Li_aMnG'_bO_{2-c}T_c$ ($0.90 \leq a \leq 1.8$, $0.001 \leq b \leq 0.1$, $0 \leq c \leq 0.05$); $Li_aMn_2G_bO_{2-c}T_c$ ($0.90 \leq a \leq 1.8$, $0.001 \leq b \leq 0.1$, $0 \leq c \leq 0.05$); $Li_aMnG'_b PO_4$ ($0.90 \leq a \leq 1.8$, $0.001 \leq b \leq 0.1$); $LiNiVO_4$; and $Li_{(3-f)}J_2(PO_4)_3$ ($0 \leq f \leq 2$):
in Chemical Formulas, A is selected from the group consisting of Ni, Co, Mn, and a combination thereof; X is selected from the group consisting of Al, Ni, Co, Mn, Cr, Fe, Mg, Sr, V, rare earth elements, and a combination thereof; D is selected from the group consisting of O, F, S, P, and a combination thereof; E is selected from the group consisting of Co, Mn, and a combination thereof; T is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof.

13. A method of preparing a cathode active material for a lithium secondary battery, the method comprising:
preparing a core material containing a compound reversibly intercalating and deintercalating lithium, and doped with fluorine;
preparing a lithium source, a phosphorus source, and/or a metal source;
uniformly attaching the lithium source, the phosphorous source, and/or the metal source onto a surface of the core material by mixing the lithium source, the phosphorous source, and/or the metal source with the core material; and
obtaining a core material of which a composite coating layer containing $Li_3PO_4$ and LiF and further containing a lithium metal compound, a metal oxide, a metal fluoride compound, and/or a combination thereof is formed on the surface by heat-treating the core material onto which the lithium source, the phosphorous source, and/or the metal source are attached.

14. The method of claim 13, wherein:
the preparing of the core material containing the compound reversibly intercalating and deintercalating lithium, and doped with fluorine,
is performed by a method of mixing the compound reversibly intercalating and deintercalating lithium with a fluorine compound and heat-treating the mixture, and
a heat treatment temperature is 800 to 1050° C.

15. The method of claim 13, wherein:
the fluorine compound used in a method of mixing the compound reversibly intercalating and deintercalating lithium with a fluorine compound and heat-treating the mixture,
is LiF, $AlF_3$, $MgF_2$, $CaF_2$, $ZrF_4$, $TiF_4$, or a combination thereof.

16. The method of claim 13, wherein:
in the obtaining of the core material of which the composite coating layer containing $Li_3PO_4$ and LiF and further containing the lithium metal compound, the metal oxide, the metal fluoride compound, and/or the combination thereof is formed on the surface by heat-treating the core material onto which the lithium source, the phosphorous source, and/or the metal source are attached,
a heat treatment temperature is 650 to 950° C.

17. A lithium secondary battery comprising:
a cathode containing the cathode active material of claim 1;
an anode containing an anode active material; and
an electrolyte.

18. The cathode active material of claim 1, wherein:
the coating layer further contains a lithium metal compound, a metal oxide, a metal fluoride compound, and/or a combination thereof.

* * * * *